Sept. 8, 1964   W. J. GILMORE   3,147,527
CABLE LOCKING DEVICE
Filed June 29, 1962
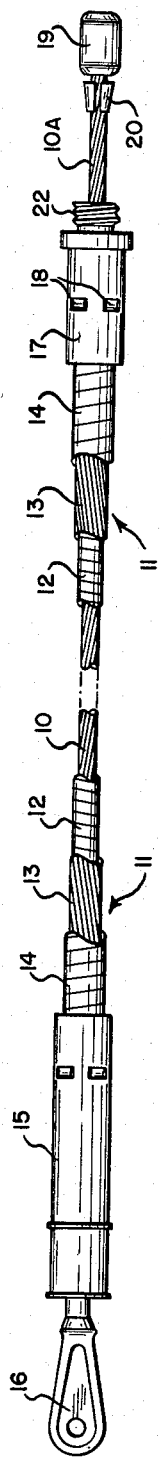
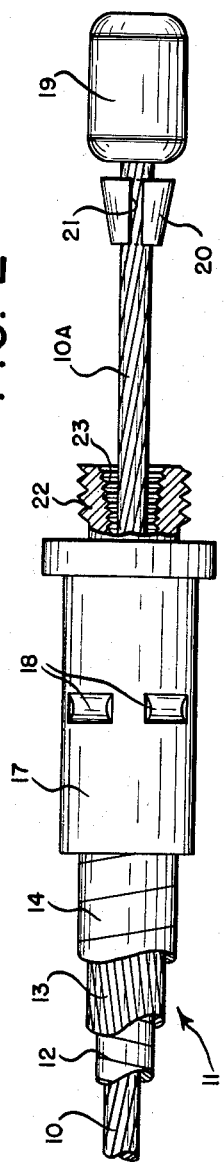
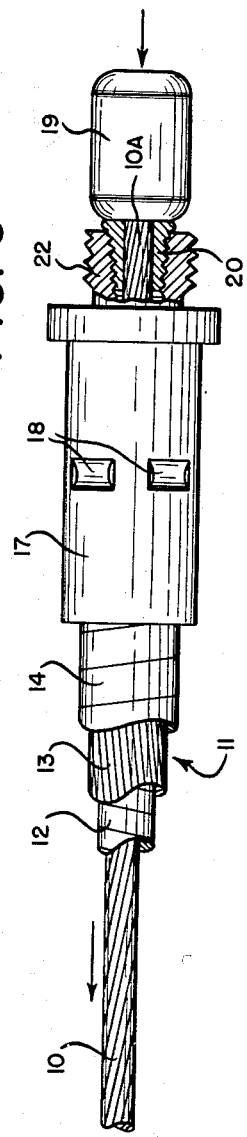
INVENTOR
William J. Gilmore
BY
ATTORNEYS

United States Patent Office 3,147,527
Patented Sept. 8, 1964

3,147,527
CABLE LOCKING DEVICE
William J. Gilmore, Manitou Beach, Mich., assignor to American Chain & Cable Company, Inc., New York, N.Y., a corporation of New York
Filed June 29, 1962, Ser. No. 206,286
1 Claim. (Cl. 24—126)

This invention relates to locking devices for preventing a cable, especially a push-pull cable core element subjected to limited translation under a high-impact load, from inadvertently bouncing back in a reverse direction after its desired forward translation is suddenly interrupted. More particularly, it relates to a locking device wherein an element displaceable with the movable cable collides with another element at the moment the translation of the cable is interrupted and their impact "freezes" the cable in place.

Though a wide range of uses exists for this new locking device, it is especially suitable for push-pull cables which serve to actuate some mechanism almost instantaneously. In aircraft personnel seat belts, for example, a latch mechanism is made rapidly releasable by means of a push-pull cable which can be instantly retracted by high-impact tensioning of its core element from detonation of a blank cartridge to pull a bolt or the like out of locked position in the latch. There have been cases where such assemblies have failed, at least under test conditions, because the explosive impulse on the core element breaks it in tension when its sudden retraction is interrupted, and as a result the bolt may bounce back so quickly that it relocks the latch mechanism before the seat belt is actually freed. One primary purpose of the new locking device is to prevent this "bounce back" in the event such a push-pull cable core element breaks under tension.

Broadly stated, the invention provides a locking device for use with a cable, a portion of which is translatable under high-impact loading toward and through a member at least partly surrounding the cable. The new locking device comprises a first locking element displaceable with the cable portion toward said member. A second locking element is affixed with respect to the member to receive the first locking element under the high-impact loading after the first locking element has been displaced with the cable portion. Means are included on at least one of the first and second locking elements for effecting a secure interattachment between those elements, and also between the first locking element and the cable, when the first locking element is received by the second locking element under the described high-impact loading of the cable.

In a more specific form of the invention, an improvement is provided in a push-pull cable wherein a projecting end portion of a translatable core is retractable under high-impact loading toward an end fitting on an adjacent end of an outer casing surrounding the greater part of the core. In this form, a male locking element is located on the core end portion and a female locking element is affixed to the outer end of the end fitting to mate with the male locking element when the core end portion is retracted toward the end fitting. Gripping means are included on the female locking element for deforming the male locking element to effect secure interattachment between those elements, and also between the first element and the core end portion, when the male locking element mates with the female locking element under the high-impact loading of the core.

In this push-pull form of this invention, the core may be retracted suddenly through a limited distance under the impulse of an exploding blank cartridge to withdraw a bolt or similar part from locking position in a seat belt latch mechanism. When the male element on the core engages the one female locking element on the casing, the rapid movement of the core stops abruptly and the male locking element is deformed by the impact into mating engagement with its female counterpart. This deformation absorbs some of the impact energy and lessens the stress on the core; but if the core still snaps, its associated bolt cannot inadvertently bounce back to relock the latch mechanism because the then-deformed male locking element has "frozen" it with respect to the casing. Complete assurance is therefore provided that the personnel seat belt will be freed and will remain freed once its blank cartridge actuator has been fired, even though the core element of the push-pull cable breaks under tension in the process.

A preferred embodiment of the invention is described hereinbelow with reference to the accompanying drawing, wherein—

FIG. 1 is an elevation partly broken away of a push-pull cable assembly embodying the invention;

FIG. 2 is an enlarged fragmentary elevation partly in section showing the new locking device on the push-pull cable assembly prior to use; and FIG. 3 is a view similar to FIG. 2 after the cable has been operated and locking has been effected.

In the push-pull cable shown in FIG. 1, a flexible core 10 made up of a plurality of helically stranded wires is surrounded throughout the greater part of its length by an outer casing 11. The latter includes a helically wrapped flat wire forming an inner liner 12 through which the core 10 is slidably movable. A long-lay wrapping of helically disposed wires forms an intermediate wall 13 of the casing 11, and an outer binding is provided by a helical wrapping of flat wire 14 which is applied tightly about the intermediate wall.

At one end of the push-pull cable, an end fitting 15 is secured to the casing 11. The core 10 extends through the end fitting 15 and has a suitable link 16 on its exposed end portion for attachment to an actuator. In this embodiment of the invention, the push-pull cable may be selectively actuated by the explosive impulse of a detonated blank cartridge which causes sudden high-impact tension to be applied to the core 10 through the link 16.

At the opposite end of the cable another end fitting 17 is securely anchored to the casing 11 by crimping the fitting 17 at certain points about the circumference, as shown by crimp marks 18 in FIGS. 1–3. All parts of the casing 11 terminate within the end fitting 17, but an end portion 10A of the translatable core 10 projects therefrom for connection with some mechanism to be operated, which in this case may be a latch mechanism on a personnel seat belt for aircraft. Thus, a button 19 is affixed to the extreme outer end of the end portion 10A of the core to serve as a bolt or other release element in such a latch mechanism.

When the above-mentioned blank cartridge is exploded to apply high-impact tension to the core 10 through the link 16 at the other end of the cable, the entire core 10 translates suddenly to the left as seen in FIG. 1 to pull the button 19 out of locking position in the associated latch mechanism. The problem of "bounce back" discussed previously arises, absent incorporation of the new locking device, when this travel of the button 19 is so abruptly terminated by collision with the outermost end of the end fitting 17 that the core element 10 breaks in tension. If that occurs, the button 19 will rebound in the reverse direction, to the right as shown in FIG. 1, back toward the latch mechanism of the seat belt. This can happen with such great force and rapidity that the button 19 may bounce back into locking position in the latch mechanism before the seat belt is actually freed. The serious consequences of this are obvious since the parted core 10 is then inoperative and the seat belt can only be released with considerable effort.

This potentially dangerous situation is avoided by the cable locking device of this invention. As shown in FIG. 2, a ferrule 20 is fitted loosely about the core end portion 10A at a point spaced between the end fitting 17 and the button 19. This fererule is of a deformable metal such as aluminum, and it has a truncated conical outer shape with the small end thereof directed toward the end fitting 17. A longitudinal split 21 extends the length of the ferrule 20 to increase its compressibility and permit easy attachment to the core.

Extending integrally from the outermost end of the end fitting 17 is an annular flange 22 which is concentric with the core end portion 10A. The outer surface of the flange 22 may be formed with exterior threads as shown to provide means for fastening the end fitting 17 to any suitable frame element. The inner surface of the flange 22 has substantially the same conical shape as the ferrule 20 with the larger end thereof directed toward the ferrule. The entire fitting 17 including the integral flange 22 is of metal, preferably steel. Extending integrally from the inner surface of the flange 22 is a plurality of circumferential lands 23 of progressively decreasing diameter conforming to the substantially conical configuration of that inner surface. These lands may advantageously be formed with sharp edges as shown in FIG. 2, and they should have a hardness considerably greater than that of the aluminum ferrule 20.

When the core 10 is subjected to high-impact tensioning as described above, its end portion 10A retracts into the end fitting 17 and the loose ferrule 20 attached thereto is brought up against and displaced suddenly by the button 19 toward the flange 22. The mating configuration between the ferrule 20 and flange 22 permits the flange to receive the ferrule when the two collide, and this engagement under high-impact loading causes the ferrule to be forcibly deformed into the grooves and interstices defined by the lands 23 and the strands of the core end portion 10A, as shown in FIG. 3. This effects a secure interattachment between the collar 22, the ferrule 20, and the core end portion 10A.

One primary advantage of this locking effect is that it "freezes" the core end portion 10A so that the button 19 at the end thereof cannot bounce back toward its associated latch mechanism even if the core 10 snaps in tension. Complete assurance is thus provided that the personnel seat belt will remain freed after its latch is once opened by detonation of the blank cartridge. Another advantage of this locking action is that it absorbs a substantial amount of impact energy, which minimizes the impact loading on the core and substantially reduces the likelihood of snapping it. In this embodiment, it may be that the push-pull cable assembly associated with the new locking device is of an expendable nature designed to be operated only once, since a considerable force is required to pull the deformed ferrule 20 out of the flange 22.

Certain variations in this particular embodiment of the new locking device may be made, of course, without departing from the scope of the invention. By way of example only, the ferrule 20 may be affixed to the core portion 10A so that it moves with the latter from the very start, rather than loosely located on the core portion 10A to move therewith only when brought up against the button 19. In some instances it may also be feasible to locate the ferrule 20 within the flange 22 in the normal condition of the assembly prior to operation, without deforming the ferrule about the lands 23 of the flange or the interstices of the core strands, so that the first displacement and deformation of the ferrule by the button 19 is almost simultaneous with the sudden interruption of the core end portion retraction.

I claim:

In combination with a push-pull cable assembly which includes a casing, an end fitting on said casing, and a core element adapted to undergo limited translation under high-impact load within said casing and through said casing end fitting, a self-locking device for automatically holding said core element with respect to said casing and said casing end fitting immediately upon completion of said translation comprising:

(a) an end element secured to an end portion of said core element projecting beyond the casing end fitting, said end element being of greater diameter than said core element, (b) a deformable ferrule loosely positioned about and slideable on the end portion of the core element between said end element and casing end fitting and movable by said end element toward said casing end fitting when said core element end portion is retracted into said casing end fitting, said ferrule being substantially smooth and conical in shape with its larger end remote from said casing end fitting, (c) an annular flange extending from said casing end fitting toward said ferrule and having an inner substantially conical surface diverging toward said ferrule for receiving said ferrule when it is moved toward said casing end fitting by said end element, and (d) a plurality of annular edged lands extending circumferentially about the inner surface of said flange and being of a material harder than said ferrule to embed into said ferrule when said ferrule is moved into said flange by said end element under high-impact retraction of said core element end portion.

References Cited in the file of this patent

UNITED STATES PATENTS

| | | |
|---|---|---|
| 1,643,110 | Briggs | Sept. 20, 1927 |
| 1,645,463 | Thomas | Oct. 11, 1927 |
| 1,970,595 | Bruzon | Aug. 21, 1934 |
| 2,060,864 | Hedler | Nov. 17, 1936 |
| 2,294,398 | Ferguson | Sept. 1, 1942 |
| 2,580,828 | Pearce | Jan. 1, 1952 |
| 2,641,810 | Gasink | June 16, 1953 |
| 2,939,732 | Rochester | June 7, 1960 |
| 2,961,205 | Moran | Nov. 22, 1960 |

FOREIGN PATENTS

| | | |
|---|---|---|
| 549,161 | Great Britain | Nov. 9, 1942 |